US012591732B2

(12) United States Patent
Rothkopf et al.

(10) Patent No.: US 12,591,732 B2
(45) Date of Patent: Mar. 31, 2026

(54) METHOD AND APPARATUS FOR PRODUCING OPTIMIZED FONTS

(71) Applicant: TECHNISCHE UNIVERSITÄT DARMSTADT, Darmstadt (DE)

(72) Inventors: Constantin Rothkopf, Steinbach (DE); Florian Kadner, Darmstadt (DE); Yannik Keller, Darmstadt (DE)

(73) Assignee: TECHNISCHE UNIVERSITAT DARMSTADT (DE)

( * ) Notice: Subject to any disclaimer, the term of this patent is extended or adjusted under 35 U.S.C. 154(b) by 148 days.

(21) Appl. No.: 18/287,215

(22) PCT Filed: Apr. 14, 2022

(86) PCT No.: PCT/EP2022/060016
§ 371 (c)(1),
(2) Date: Oct. 17, 2023

(87) PCT Pub. No.: WO2022/223431
PCT Pub. Date: Oct. 27, 2022

(65) Prior Publication Data
US 2024/0202426 A1      Jun. 20, 2024

(30) Foreign Application Priority Data
Apr. 19, 2021      (DE) ...................... 10 2021 109 845.9

(51) Int. Cl.
*G06F 40/109* (2020.01)
(52) U.S. Cl.
CPC .................................. *G06F 40/109* (2020.01)

(58) Field of Classification Search
CPC ... G06F 3/01; G06F 3/02; G06F 3/041; G06F 17/00; G06F 18/2415; G06F 40/109; G06F 30/27; A61B 5/00; A61B 5/05; A61K 47/52; A61K 47/62; C07K 1/13; C07K 14/245; C07K 14/32; C07K 17/14; C12Q 1/68
See application file for complete search history.

(56) References Cited

U.S. PATENT DOCUMENTS 5,586,241 A * 12/1996 Bauermeister ........ G06T 11/203
345/170
2004/0051893 A1* 3/2004 Yoshida ............. G06K 15/1827
358/1.11
(Continued)

FOREIGN PATENT DOCUMENTS

CN       108804397 A      11/2018
DE       102018005611 A1      4/2019
(Continued)

*Primary Examiner* — Rayeez R Chowdhury
(74) *Attorney, Agent, or Firm* — Christensen, Fonder, Dardi & Busse PLLC

(57)      ABSTRACT

A computer-implemented method for producing optimized fonts for display on a screen is disclosed. The method includes: forming a font space in which various fonts are characterized by dimensions of the font space; selecting a starting point in the font space, wherein an associated starting font belongs to the starting point; continuously changing the position in the font space and thereby changing a font used for display in order to find an optimum for at least one parameter value; and providing the optimized fonts for display on the screen.

8 Claims, 7 Drawing Sheets

(56) References Cited

U.S. PATENT DOCUMENTS

| | | | | |
|---|---|---|---|---|
| 2005/0034073 A1* | 2/2005 | Kim | ...................... | G06F 40/109 |
| | | | | 715/250 |
| 2007/0159470 A1* | 7/2007 | Jeng | ......................... | G06F 3/14 |
| | | | | 345/204 |
| 2008/0266298 A1* | 10/2008 | Hess | ................... | G09B 29/007 |
| | | | | 345/467 |
| 2009/0143238 A1* | 6/2009 | Chen | ................... | C12Q 1/6876 |
| | | | | 506/17 |
| 2016/0117977 A1 | 4/2016 | Soniwal et al. | | |
| 2016/0378720 A1* | 12/2016 | Bacus | ................... | G06F 40/103 |
| | | | | 715/251 |

FOREIGN PATENT DOCUMENTS

| | | | |
|---|---|---|---|
| JP | 2004101937 A | 4/2004 | |
| JP | 2012230652 A | 11/2012 | |
| WO | WO2020124455 A1 | 6/2020 | |

* cited by examiner

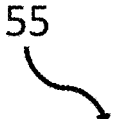

55

| Akzidenz Grotesk (Lorem Ipsum) | Avant Garde (Lorem Ipsum) | Avenir (Lorem Ipsum) | Bembo (Lorem Ipsum) | Bodoni (Lorem Ipsum) |
|---|---|---|---|---|
| Clarendon (Lorem Ipsum) | Cocon (Lorem Ipsum) | Dax (Lorem Ipsum) | Din (Lorem Ipsum) | Frutiger (Lorem Ipsum) |
| Futura (Lorem Ipsum) | Garamond (Lorem Ipsum) | Gill Sans (Lorem Ipsum) | Helvetica (Lorem Ipsum) | Meta (Lorem Ipsum) |
| Minion (Lorem Ipsum) | Mrs Eaves (Lorem Ipsum) | Myriad (Lorem Ipsum) | News Gothic (Lorem Ipsum) | Optima (Lorem Ipsum) |
| Rockwell (Lorem Ipsum) | Rotis (Lorem Ipsum) | Sabon (Lorem Ipsum) | Univers (Lorem Ipsum) | VAG Rounded (Lorem Ipsum) |

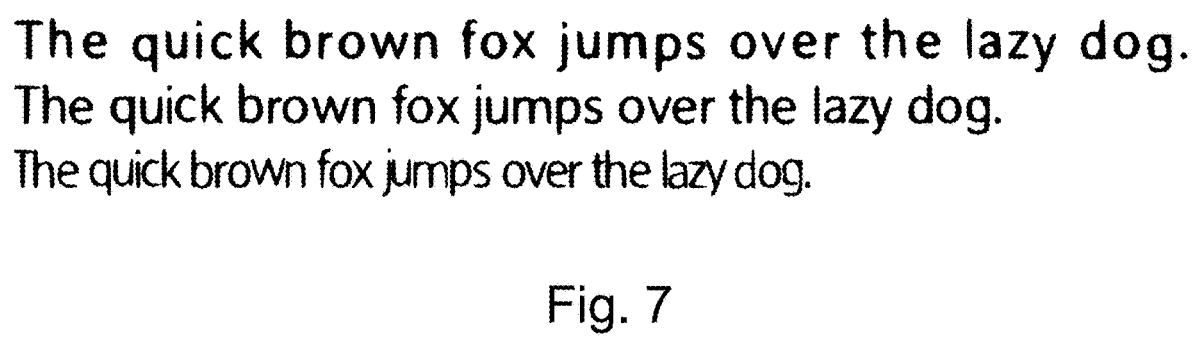

The quick brown fox jumps over the lazy dog.
The quick brown fox jumps over the lazy dog.
The quick brown fox jumps over the lazy dog.

Fig. 7

METHOD AND APPARATUS FOR PRODUCING OPTIMIZED FONTS

PRIORITY CLAIM

The present application is a National Phase entry of PCT Application No. PCT/EP2022/060016, filed Apr. 14, 2022, which claims priority from German Patent Application No. 10 2021 109 845.9, filed Apr. 19, 2021, the disclosures of which are hereby incorporated by reference herein in their entirety.

FIELD OF THE INVENTION

The present invention relates to a method and apparatus for producing optimized fonts and, in particular, to a computer-implemented method and system for producing adapted fonts.

BACKGROUND

Digital text has become one of the primary ways of sharing knowledge, with text for reading usually displayed on a screen over a printed matter (fonts). Traditionally, the transformation of text into the actual visible letters follows a complex process that includes artistic and design considerations in the creation of characters or typefaces, the selection of specific fonts, and many typographic decisions regarding the spatial placement and arrangement of letters and words.

A fundamental question in the presentation of text is whether the way the text is presented affects how it is read, processed, and understood. Numerous empirical studies have measured how characteristics of written text affect its perception when read both on paper and on electronic devices. Overall, however, the results of these empirical studies on the relationship between reading speed or reading comprehension and written text parameters are mixed and sometimes contradictory.

Some of these fonts (specific typefaces) were developed to improve legibility for people with visual impairment. Still others were developed to increase legibility or readability on small electronic devices. However, individual optimization is not possible with them.

Therefore, there is a need for a way to provide optimized fonts for screens that can be customized as desired.

SUMMARY OF THE INVENTION

At least some of the above-mentioned problems are solved by a computer-implemented method for producing optimized fonts for display on a screen according to the claims, and a system according to the claims. The dependent claims refer to further advantageous realizations for the subject matters of the independent claims.

The present invention relates to a computer-implemented method for producing optimized fonts for display on a screen. The method comprises the steps of:

- forming a font space in which various fonts are characterized by dimensions of the font space or providing parametric font spaces;
- selecting a starting point in the font space, wherein an associated starting font belongs to the starting point;
- continuously changing a position in the font space and thereby changing a font used for display in order to find an optimum for at least one parameter value; and
- providing the optimized fonts for display on the screen.

Thus, the font space does not need to be created from scratch. According to embodiments, parametric font spaces such as parametric typographies can also be utilized in the method.

Optionally, one or more of the following is used for the at least one parameter value:

- a storage occupancy,
- an amount of printer ink when printing text,
- a scanning speed,
- a speed during automatic text recognition,
- a reading speed of a user,
- a memory of a user,
- a text comprehension of a user,
- a preference for the read text of a user.

Optionally, the method further comprises detecting a quantity that determines the at least one parameter value. For example, this quantity may come from a sensor that senses the parameter value. For example, the storage occupancy may be directly sensed at a computer. The same is true for a used toner (printer ink) or the speed of scanning or text recognition. The reading speed can be determined with an eye scanner (which detects the eye movement) or via a user input (e.g., when turning the page on an electronic reader).

According to further embodiments, a memory or text comprehension may be records or captured by means of cognitive testing, e.g., using common questioning methods that test the degree of comprehension. Optionally, preference may also be captured using cognitive testing procedures or determined using pupillometry (eye scanners).

Optionally, one of the numerous parametrically designed typefaces already developed by typographers is used. These are fonts that produce different characters by numerically changing a few parameters. In particular, the parameter changes the appearance of the font and not (only) the font size and/or the font slant and/or the font thickness.

Optionally, the font space is formed as a continuous space with a dimension N that interpolates between M known fonts. In this way, the fonts are continuously changed (i.e., not erratically) as the position in the font space is continuously changed. The dimension N of the font space can be determined by cross-validation based on the M known fonts. Possible values are, for example, N=2, 3, 4, 5, . . . and M has at least one value of 10, 15, 20, 30. In principle, however, these values can be arbitrary.

Optionally, the font space is formed as by the following steps:

- setting up a data matrix X that includes entries for one known font in each row or column;
- forming a base matrix W and a coefficient matrix H by minimizing a Frobenius norm for a difference of the data matrix X and a product of the base matrix W and the coefficient matrix H:

$$\text{Min}|X - W \times H| \tag{1}$$

wherein the base matrix W is an M×N matrix. The product W×H is the usual matrix product, where the values of the rows and columns are scalar multiplied with each other.

Optionally, the continuously changing the position to find the optimum comprises an application of at least one of the following methods:

- a Bayesian optimization in which successive points in the font space are tested to find regions in the font space where the parameter value improves (e.g., reading speed increases);
- a density-based cluster analysis (e.g., the OPTICS method), wherein the parameter value to be optimized is added as a fourth dimension and the points of a data set are linearly ordered so that spatially nearest neighbors are arranged together as a cluster;

an analysis of variance (e.g., ANOVA, MANOVA) to identify statistically significant differences between clusters.

It is understood that these steps are optional. The system works in principle also without a) the density-based cluster analysis and also without b) an analysis of variance. These two methods can be used to a) better evaluate the typefaces in their similarity and b) to investigate whether the human reading speeds are actually statistically significantly better.

This method, or at least parts thereof, may also be implemented or stored in the form of instructions in software or on a computer program product, wherein stored instructions being capable of executing the steps according to the method when the method is running on a processor. Therefore, the present invention also relates to computer program product having a program code (software instructions) stored thereon that is adapted to perform any of the previously described methods when the program code is executed on a processor. The processing unit may be any form of computer or control unit that comprises a corresponding microprocessor capable of executing the program code. Further embodiments also refer to a computer-readable storage medium having instructions stored thereon that, when executed by a computer, causing the computer to execute the method as previously described.

Further embodiments relate to a system (apparatus) for producing optimized or adapted fonts for display on a screen. The system comprises: a production module, an optimization module, and an output interface. The production module is configured to form a font space in which various fonts are characterized by dimensions of the font space. The optimization module is configured to select a starting point in the font space, wherein an associated starting font belongs to the starting point. Furthermore, the optimization module is adapted to change a font used for display by continuously changing the position in the font space in order to find an optimum for at least one parameter value. The output interface is designed to output the optimized font for display on a screen.

Bayesian optimization is known to skilled person as a global optimization method for black-box functions, wherein iteratively hyperparameter configurations are tried which appear promising according to a current model. Subsequently, the model is adjusted by the new findings. Bayesian optimization thus tries to collect as many observations about the function as possible, in particular, about the location of the optimum. It simultaneously considers the exploration of areas where little knowledge about the expected performance (exploration) is available and the exploitation of knowledge about areas where the optimum is expected (exploitation).

Advantages of embodiments arise in particular from the fact that fonts can be adaptively produced and step by step optimized, for example to increase the individual reading speed or to be able to improve other parameters. The system is based on a generative typeface space that is learned in a data-driven manner by non-negative matrix factorization (NMF) from a set of classical fonts (e.g., 25).

Embodiments use this typeface space to generate new fonts and measure how a generated font improves the exemplary reading speed or reading rate at an individual user level. Using Bayesian optimization, embodiments select new fonts from the generative font model to find those fonts that have an optimal result (e.g., allow the reader to read text faster).

Studies conducted with test subjects have shown that human perception of the displayed information will be enhanced. According to the invention, this goal was achieved by presenting image content in a way that takes into account the physical conditions of human perception and inclusion of information. Thus, the presentation of image content does not follow aesthetic considerations, but serves to increase the efficiency of the human-machine interface.

To achieve this technical goal, for example, parameters of the fonts are automatically set by the interaction of the user, i.e. the reader, in order to improve perception, for example. Aesthetic criteria do not enter into the method, but rather cognitive criteria (text processing speed) or perceptual criteria (legibility or readability). Of course, it cannot be ruled out that the fonts with the best text processing speed and excellent legibility will also be considered aesthetically pleasing by the user. However, it can also be the other way around, i.e. the fonts resulting from the optimization are considered to be particularly unaesthetic. In any case, aesthetics is not a primary goal of optimization.

BRIEF DESCRIPTION OF THE DRAWINGS

The embodiments of the present invention will be better understood with reference to the following detailed description and accompanying figures of the various embodiments, which, however, should not be understood as limiting the disclosure to the specific embodiments, but are merely for explanation and understanding.

FIG. 3 shows an example of names of 25 fonts (baseline fonts) shown in their respective typefaces.

FIG. 7 shows fonts produced from the centroids of the best clusters for subjects.

DETAILED DESCRIPTION

Figure 1:
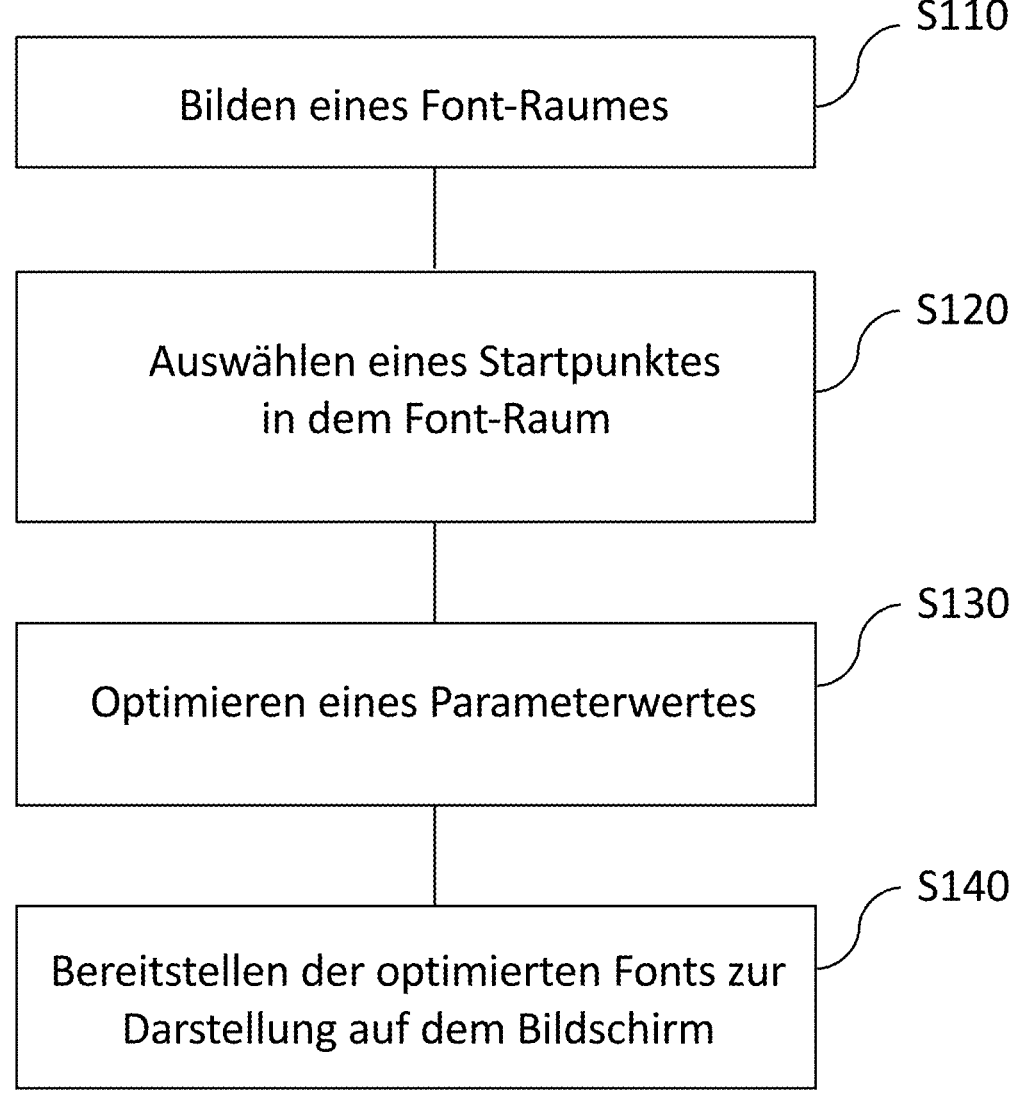
FIG. 1 shows a schematic flowchart for a method according to an embodiment of the present invention.

FIG. 1 shows a schematic flowchart for a method of producing optimized fonts for display on a screen.

The method includes:

forming S110 of a font space in which various fonts are characterized by dimensions of the font space;

selecting S120 a starting point in the font space, wherein an associated starting font belongs to the starting point;

optimizing S130 at least one parameter value by continuously changing the position in font space and thereby changing a font used for display; and providing S140 the optimized fonts for display on the screen.

It is understood that no new font space needs to be created when forming the font space. An already known font space can also be utilized for embodiments. For this purpose, the font space is read in a data processing unit and thus created there. For example, parametric font spaces can be used for this purpose (e.g., parametric typographies). Typography refers, for example, to a media-independent design process that is achieved by means of type, images, lines, areas, spaces, runs, ligatures, and so on.

It is understood that embodiments may perform a wide variety of optimizations. Further, the method may be computer-implemented, i.e., implemented by instructions stored on a storage medium and capable of executing the steps of the method when the instructions are executed by a processor. The instructions typically include one or more instructions that may be stored in different ways on different media in or peripheral to a control unit (having a processor) that, when read and executed by the control unit, cause the control unit to perform functions, functionalities, and operations necessary to perform a method according to the present invention.

In the following, embodiments are described primarily with respect to improving the reading speed. However, it is understood that the embodiments described in the following are applicable in an analogous or similar manner to other parameter values that are to be optimized (e.g., to a storage occupancy, an amount of printer ink when printing texts, a scanning speed, a speed in automatic text recognition, etc.).

Figure 2:
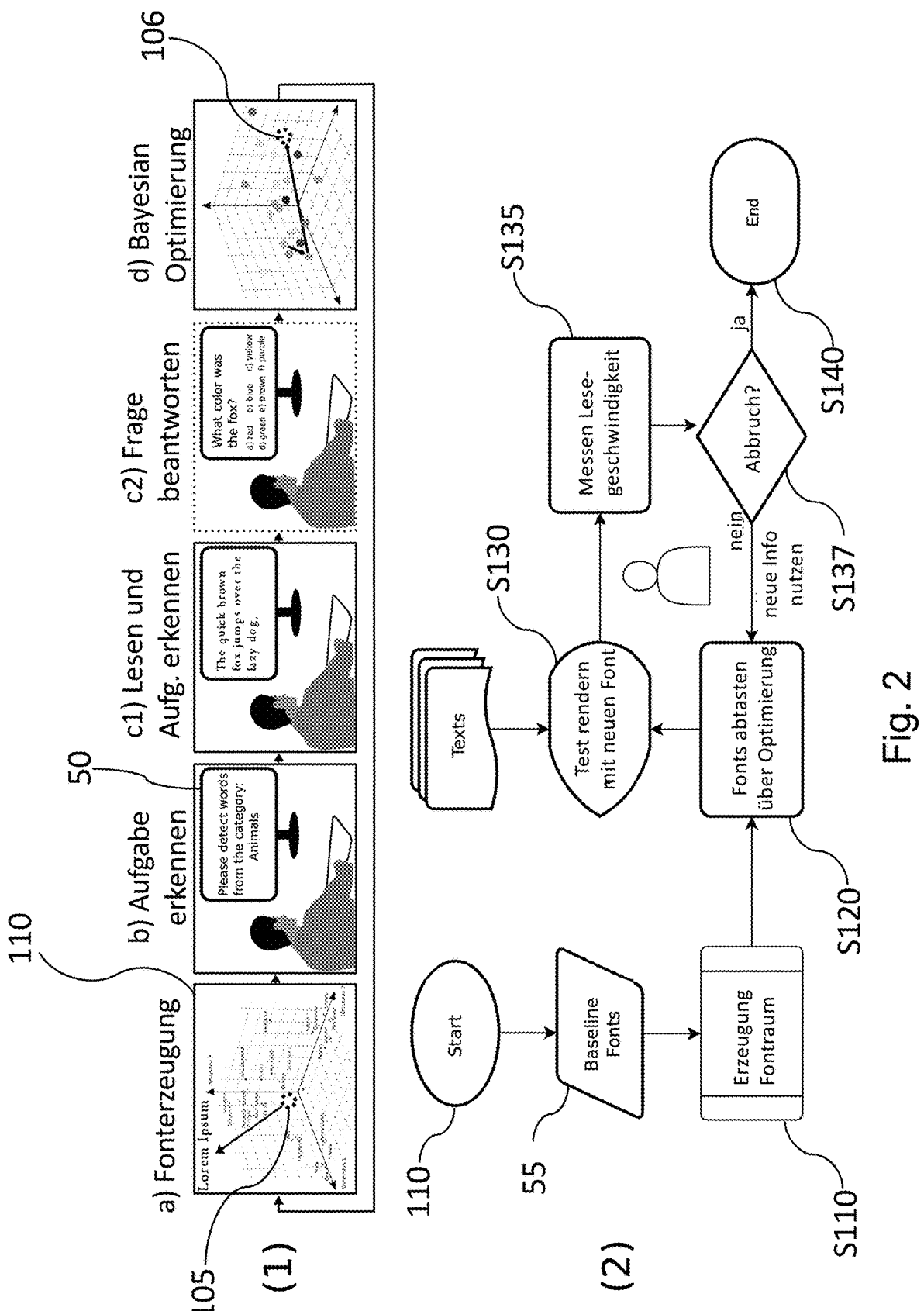
FIG. 2 shows a process sequence for interactively improving the legibility of texts displayed on a monitor according to further embodiments.

FIG. 2 shows one way of interactively improving the exemplary legibility of texts displayed on a monitor (display screen 50). The lower part (2) illustrates the overall process. In the upper part (1) the iterative optimization is shown in more detail.

Referring to the lower part (2), after a start (step S10), a set of classical fonts are provided (baseline 55). Then, a generative typeface space with non-negative matrix factorization (NMF) is first formed or learned from a set of classical typefaces (step S110). In this space, embodiments generate new true-type fonts by active learning (step S120), render texts (step S130) with the new font, and measure the exemplary reading speed (step S135) of each user. Whether an optimum is reached, it is determined in step S137. If this is the case, the method ends with step S140, where the optimized font is provided for display.

The iterative process of steps S120, S130, S135 and S137 is shown in more detail in the upper part (1). There, the font space 110 is shown first, wherein the process starts under a) with a start font 105. Next, under b) a question can be asked, where the user has to recognize a word. This is followed by first reading a text under c1) and then checking whether the user has read carefully (e.g., by answering a question) under c2). With steps b), c1) and c2), the reading speed can thus be measured. In step d), optimization is performed by changing the position, i.e., a new position 106 in font space 110 is selected (e.g., utilizing a Bayesian optimization). The process is repeated until step S137, see lower part (2), it is determined that no further progress is made.

The new fonts (typefaces) are generated sequentially "on the fly" in step S130 (or b), e.g., via Bayesian optimization, to progressively the exemplary reading speed of users.

Comparative experiments showed that:
  this adaptive font generation system finds regions in typeface space 110 that correspond to high reading speeds,
  these fonts significantly increase the exemplary reading speed of the participants, and
  the found fonts differ significantly between the individual readers.

It is understood that the procedure can be applied to other areas as well. The optimization can be performed with respect to many parameters, including: storage occupancy, amount of printer ink when printing texts, scanning speed, speed of automatic text recognition.

The individual steps are described in more detail below:

A. Learning or Creating a Typeface Space (Step S110)

To synthesize new fonts based on a given baseline 55, embodiments first utilize a parametric generative font model. Here, embodiments use a so-called "non-supervised learning" to obtain the continuous font space 110. Specifically, embodiments utilize non-negative matrix factorization, NMF, as a method for reducing the dimensionality of fonts. To cover a basic set of fonts, including fonts with serifs and sans-serif fonts, a list of classic and popular fonts may be selected, e.g., including a total of 25 classic fonts.

FIG. 3 shows an example of names of 25 fonts (baseline fonts 55) displayed in their respective typefaces. To perform NMF, a grayscale image can be generated or produced that comprises all 26 letters in upper and lower case, the numbers from zero to nine, the German umlauts, parentheses, question marks, exclamation marks, period, comma, hyphen, colon, semicolon, slash, and quotation marks. The letters were arranged side by side. The image data was then linked together with information about the alignment of each glyph in the font, obtained from the corresponding information in the TrueType file.

The NMF method is based on the idea of approximating a matrix X with the product of two matrices W, H such that the following relation holds:

$$X = W \cdot H \tag{1}$$

This factorization is done under the constraint that the approximation must satisfy the Frobenius norm $$|X - W \cdot H| \tag{2}$$

minimized and that all entries of W, H are non-negative. The columns of W then represent the dimensional features and H includes the weights to combine these features to reconstruct the rows in X.

Specifically, the matrices can be formed as follows. The matrix X is the data matrix. This comprises all the information of the baseline typefaces 55 and is now to be decomposed into N basis vectors to span the typeface space. In principle, this is similar to a classical principal axis transformation. To obtain the data matrix X, black and white images of a certain pixel size (e.g., 2375×51) can be created for each typeface, in which all 26 letters of the alphabet in lowercase and uppercase, all digits from 0 to 9, all German umlauts, brackets, question and exclamation marks, comma, quotation marks, colon, semicolon, slash and punctuation point can be seen (in total this is 81 characters). All these components can be aligned and displayed side by side. Each of these pixels now comprises a gray value that represents, for example, a value between 0 and 255 (where 0 is black and 255 is white, and gray levels interpolate in between).

These images can be "flattened". To do this, each row of the image is simply arranged one after the other, resulting in a one-dimensional representation of the image. In our case, this results in a list of e.g., 2375×51=121125 values.

In addition, for each baseline typeface, the information about kerning, i.e. the spacing between characters in the body text, is extracted. The information is stored in *.ttf font files for each character and includes padding to the left, right, and down. In addition, embodiments may also store a value indicating the line height and a value for the length of the space. With 81 characters, this results in a list for distance information with 81×3+2=245 entries. This is appended to the list for the "flattened" image, so that the list now includes 121125+243=121370 entries in the example.

The matrix X has such a list in each row, so that its dimension in the chosen example is 25×121370, since we express 25 typefaces in this one-dimensional representation.

Next, a representation is searched for to reconstruct this matrix X. For this purpose two matrices W. H are searched, which multiplied again result in the matrix X or at least in a good approximation. The equation (1) should be valid, wherein W is the matrix of the basis vectors and H is the matrix of the coefficients, which multiplied with the basis vectors result in the typefaces.

This is implemented by minimizing the Frobenius norm so that the reconstruction error is as small as possible. There are already existing algorithms for the implementation of this minimization (see https://en.wikipedia.org/wiki/Non-negative_matrix_factorization#Algorithms), which can be utilized for this purpose according to embodiments.

For the 25 exemplary baseline typefaces 55, the matrix W has the dimensions 25× N and the matrix H has the dimension N×121370, so that when both matrices are multiplied, the dimension of matrix X is reconstructed again. The size N is a free parameter in this case and indicates the dimensions of the typeface space 110 to be spanned in the selected case. For example, N=3 may be selected, wherein the invention is not intended to be limited to a particular N.

In order to reasonably select the dimension, a compromise can be made between reconstructing as well as possible and generalizing as well as possible. Specifically, this means: if N is very large, the original typefaces can be approximated very well, since many features are utilized to represent the fonts. At the same time, however, there is a problem that only those features are learned that are present in the typefaces used. Then the difficulty arises to reconstruct other, new fonts, which are not present in the baseline 55 and possibly possess completely different characteristics. In addition, there is the problem that optimizing the reading speed using Bayesian optimization becomes more and more difficult, more additional dimensions have to be considered. For a compact representation of the fonts, it is therefore advantageous to select an N that is not too large and not too small. For the technical implementation, a method from machine learning can be utilized, which is known to those skilled in the art as cross-validation. This method assesses how results of a statistical analysis can be generalized to an independent data set, estimating how accurately a predictive model will perform in practice.

The columns of the basis matrix W now contain the dimensional features, i.e. the basis vectors. The coefficient matrix H now specifies the weights with which the original fonts can be reconstructed. The concrete implementation example uses three components (N=3), in order to ensure a sufficiently extensive font representation and at the same time to avoid overfitting to the data.

In the following, the influence of these three columns will be described.

Figure 4:
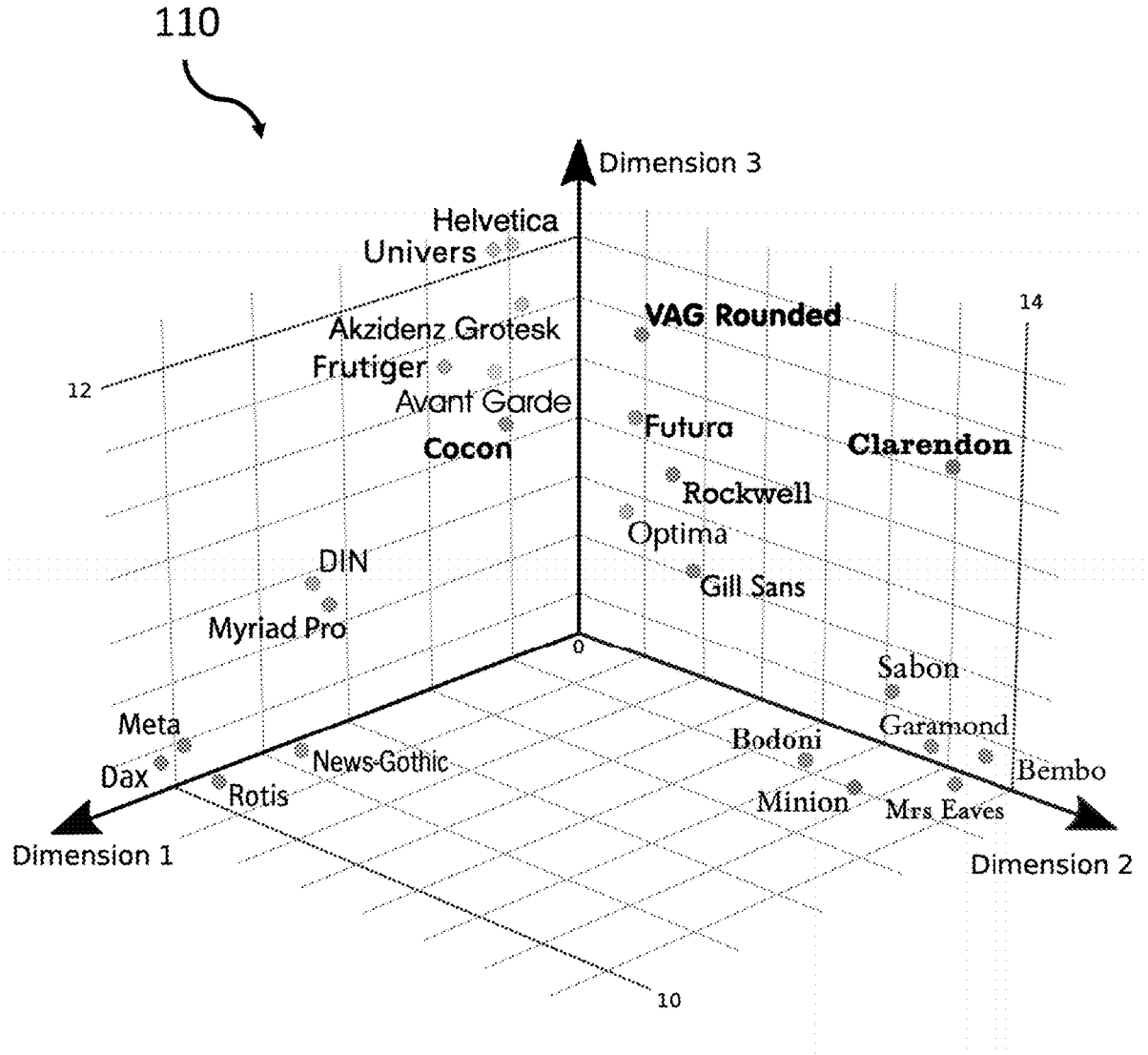
FIG. 4 shows the presentation of the 25 fonts in the font space.

FIG. 4 shows the representation of the 25 fonts in the three-dimensional font space 110. By this representation, it is now possible to synthesize new fonts as linear combinations of the three learned font basis vectors. Accordingly, a font can be represented by a point in this three-dimensional space. For example, if two typefaces, Clarendon and Dax, are taken for comparison, Clarendon has pronounced serif typeface, but Dax does not. This means that the weights in the coefficient matrix H for the feature "serif", which is encoded in the columns of the base matrix W, will be significantly larger for Clarendon to recover the serif. This can be thought of as "printing ink on paper." The printer is instructed how much ink to use on the serif.

Figure 5A:
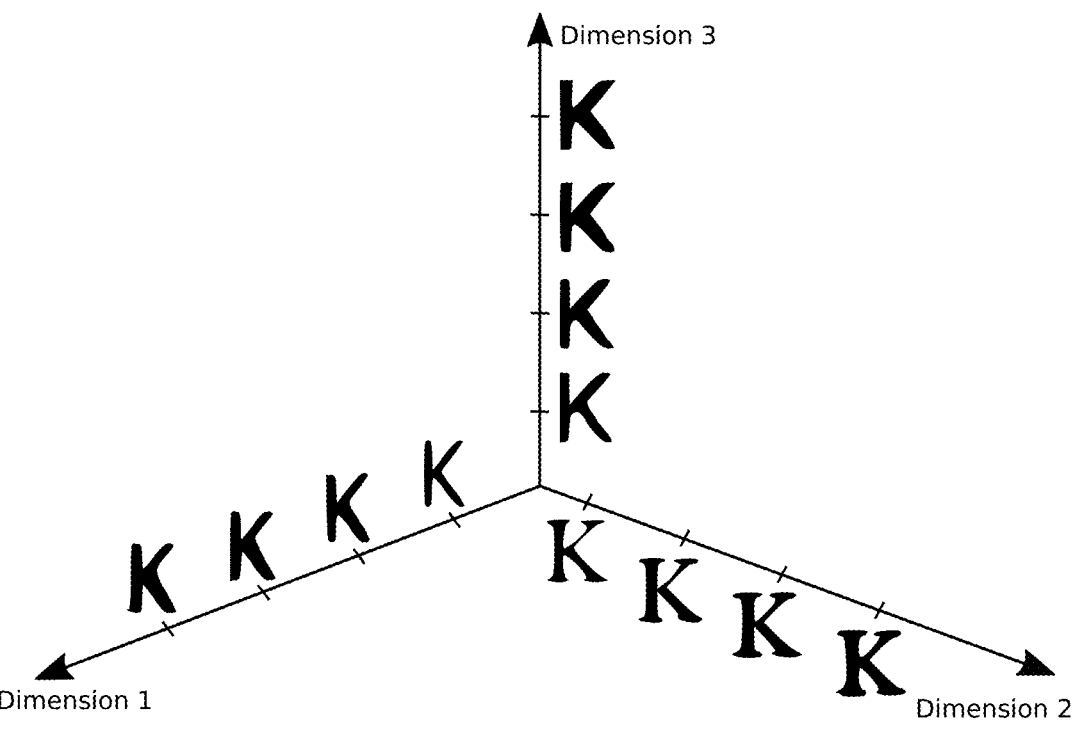
FIG. 5A illustrates the influence of the exemplary three dimensions of the font space for the uppercase letter K

FIG. 5A shows an example of the influence of the three dimensions for the uppercase letter K. Examination of the letter rendering shows that the first and third dimensions are related to the scaling of the letters in the vertical and horizontal directions, respectively, while the second dimension is related to the presence and strength of serif. This generative model allows for a reduction in memory requirements for storing all fonts, creating new fonts, and also interpolating between current fonts.

Figure 5B:
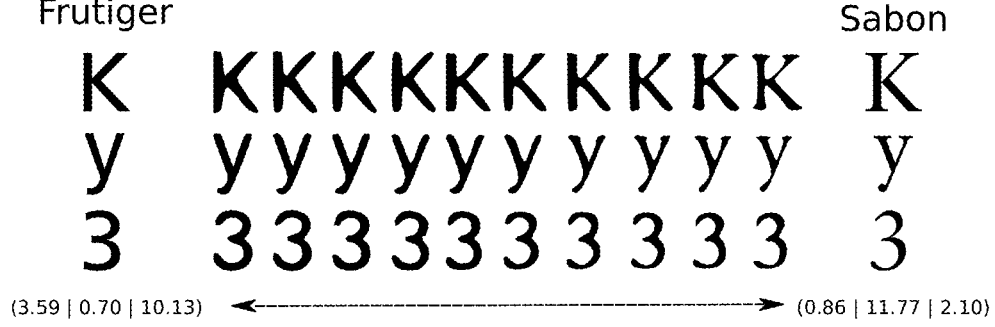
FIG. 5B shows an interpolation according to embodiments between the Frutiger and Sabon fonts.

FIG. 5B shows the changes in three characters (uppercase letter K, lowercase letter y, and number 3) resulting from linear motion in Euclidean space 110 between points corresponding to the Frutiger and Sabon typeface, i.e., points (3.59, 0.7, 10.13) and (0.86, 11.77, 2.10) in font space 110. The original fonts are at the edges, the NMF approximations to the right, and the linear interpolation through typeface space in between. The coordinates for both fonts in the three-dimensional space are given. Note that the changes are gradual and uniform.

An advantage of the strictly positive components of the NMF method according to embodiments over other methods such as principal component analysis or transformer networks is that the basis functions represent printer ink on paper and thus can be viewed as elements that resemble actual glyphs. In contrast to embodiments, conventional implementations suffer from alignment and kerning problems in continuous text. Qualitatively satisfactory texts can hardly be generated with them.

As mentioned above, embodiments generate TrueType Font (TTF) files on "the fly" to be able to generate text with a synthesized typeface. A linear combination of the basis vectors obtained by NMF results in a vector comprising a new grayscale bitmap image of all glyphs in the new synthesized font, as well as alignment information for each glyph. The bitmap images of the glyphs can be individually converted to Scalable Vector Graphics (SVG) and then merged into an SVG font. The SVG font can then be converted to TTF format. At this point, alignment information can also be inserted directly into a TTF file. The entire font production process works automatically and in real time.

B. Optimization (e.g., Bayesian Optimization Method; Step S130).

According to embodiments, it is possible to generate fundamentally new typefaces which, for example, neither belong to baseline fonts 55 nor are otherwise known and which, for example, increase the reading speed of the participants or improve another parameter. For this purpose, an optimization method is selected that finds corresponding regions in the three-dimensional typeface space 110.

As an underlying assumption, it can be assumed that the typefaces change uniformly within the generative typeface space (font space 110) and that the exemplary reading speed of the participants also changes uniformly along similar typefaces. For example, the objective function to be optimized may be the reading speed of an individual as a function of a particular font, which in this case is represented by a point in the exemplar three-dimensional typeface space 110 (N=3).

Since the typeface space 110 is in principle infinite and only a limited number of texts can be represented, embodiments utilize Bayesian optimization since it is a well-known optimization technique for finding extrema of complex cost functions when the number of samples that can be drawn is limited.

Bayesian optimization starts with an a priori uncertainty about the three-dimensional font volume and successively selects points within this volume for which the exemplary reading speed is evaluated by a reading experiment. The idea now is to start with one of these points and assume that it represents a value of the underlying unknown function. By evaluating the exemplar reading speed for this font through an experiment, the algorithm reduces the uncertainty at this point in the typeface space (see steps c1 and c2 from FIG. 2).

To select the next font for testing, a compromise is sought (see step d) in FIG. 2) between (i) selecting an area in the typeface space for which the uncertainty about the exemplary reading speed is high, and (ii) selecting an area in the typeface space where a high reading speed can be expected based on previous reading experiments.

This selection process is performed by the so-called acquisition function and its corresponding parameters.

Thus, in the exemplar Bayesian optimization, regions where the exemplary reading speed is high are sampled more densely, and regions where uncertainty is high are sampled (tested) more uniformly.

C. Exemplary Experimental Setup and Data

To demonstrate the performance of embodiments, an example experiment is described below.

The overall closed loop of the experiment (see FIG. 2) comprised generating a font in the generative typeface space 110 through the Bayesian optimization algorithm and using the exemplary reading speed individual participants to generate new fonts for which the exemplary reading speed is higher.

For this purpose, 11 subjects (5 women, 6 men; expected value for age=24 with standard deviation=2.64) participated in the experiment. All participants were native German speakers and had normal or corrected-to-normal vision. Participants were recruited by graduate and undergraduate students in the research group and were provided with the necessary materials to participate. All subjects received detailed, multi-page instructions to keep influences such as seating position, viewing distances, room lighting, etc. as similar as possible. In addition to detailed instructions and information about the experiment, subjects also received an executable file containing the experiment. The subjects were non-experts in terms of font production and selection procedures.

The subjects read a total of 95 texts taken from a German wiki for children's lexicon texts. These texts were selected because they are easy to understand for adult native speakers, so that the content of the texts had only a minor influence on the exemplary reading speed. Furthermore, the texts were selected to be comparable in length, i.e., the word count of the first 94 texts averaged 99.7 with a minimum of 91 and a maximum of 109 words. In addition, a single text with only 51 words was selected to test whether exemplary reading speed differed significantly as a function of text length. Texts were presented in a random order for each participant.

To measure a user's exemplary reading speed according to embodiments, subjects pressed a button when they began reading a text and pressed the button again when they finished reading the text. In one application scenario, the exemplary reading speed could be measured using the page advance button on an e-reader such as a Kindle. Further embodiments utilize an eye-tracker or a standard computer webcam to measure the exemplary reading speed.

The texts were to be read attentively and as quickly as possible, but only once in total. In order to check whether the texts were read and processed in terms of content, the subjects had the task of recognizing words from predetermined categories while reading. Each individual experiment began, according to performance examples, with the presentation of the category for the next text, e.g., before reading the text, it was stated that words from the category animals were to be recognized afterwards. The category referred only to the next text, and a new category was selected for each experiment. The category of each text was previously named independently by two of the authors of this study, and each subject was given the same category for one text.

For each text, there were between one and ten words belonging to the instructed categories (mean: 3.07, standard deviation: 2.05). Once a subject read the category for the next experiment, he or she could use the space bar to display the text and begin reading. Once the text was displayed, timing for exemplary reading speed also began. To avoid an accidental start, according to embodiments, the task could not be started until a few seconds after the category was displayed (this was indicated to exemplar participants by a red/green signal). Each time a term was detected that matched the predefined category, participants could press the space bar to indicate this. For example, for the short sentence, "The quick brown fox jumps over the lazy dog." when reading the words fox and dog, the space bar should be pressed to indicate that the objects for the animal category were recognized (see step c1) from FIG. 2). Once the text was finished reading, the Enter key could be pressed to stop the reading and thus also the timing.

In addition, after reading eleven texts in random attempts during the experiment, a multiple-choice question was asked (see step c2) in FIG. 2) to additionally test the subjects' understanding of the text. The question always referred to the last text read and six possible answers were given, of which exactly one was correct. After solving one of the multiple-choice questions, participants received feedback on their answer. This feedback consisted of the average reading speed, the number of correct recognitions, and the correctness of the multiple-choice question. These three components were combined into a score to further motivate participants to read quickly, but also correctly and attentively.

To investigate whether there are regions of generative typeface space 110 that allow higher reading speeds, subjects read the 95 texts in different synthesized fonts. Since the three-dimensional space is infinite in size and only a limited number of texts can be presented, Bayesian global optimization with the Gaussian method was used to make do with only 95 samples of various fonts, wherein the objective function to be optimized is the exemplary reading speed parameterized by the three dimensions. To identify regions in the typeface space with higher reading speeds, embodiments use a clustering method that includes reading speed as a fourth dimension in addition to the three font dimensions for each individual participant.

The OPTICS algorithm can be used to cluster the data points. This is a density-based clustering method that linearly arranges the points of a data set so that spatially nearest neighbors can be arranged together as a cluster. This has the advantage over other methods, such as k-Means, that the number of clusters does not have to be determined in advance and outliers that are not assigned to a cluster can be detected. The latter is useful in the analysis of the data, as it allowed phases with deviations in reading speed due to attentional errors to be excluded.

Figures 6A, 6B:
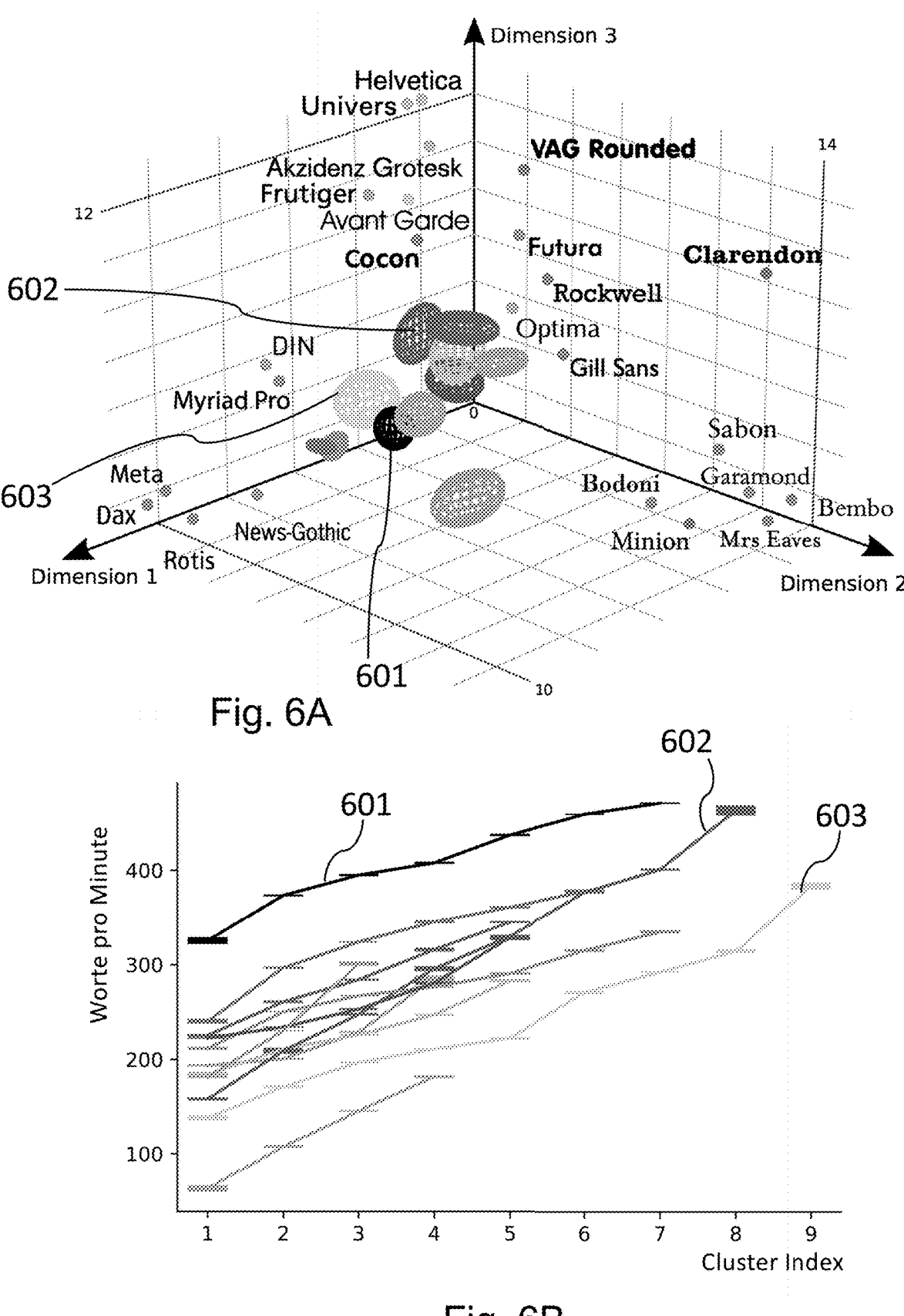
FIG. 6A illustrates the clusters corresponding to the highest reading speed.
FIG. 6B shows the mean reading speeds for each of the font clusters found together with the corresponding 95% confidence interval (credibility interval) for each subject.

The free parameter of the algorithm is defined as the minimum number of data points that should be present in a cluster. This parameter was set to n=5 (it should be twice the dimension minus 1). FIG. 6A illustrates the best clusters 601, 602, 603, . . . , corresponding to the highest reading rate. A first cluster 601 corresponds to a first subject, a second cluster 601 corresponds to a second subject, a third cluster 601 corresponds to a third subject, etc. Clusters 601, 602, . . . are represented by an ellipsoid, with the center of all associated data points and the standard error in all three dimensions as major axes.

FIG. 6B shows found clusters 601, 602, 603, . . . for each of the 11 subjects based on the density-based algorithm for cluster analysis (OPTICS) and the associated mean reading speeds along with their standard errors. The mean reading speeds of all clusters 601, 602, 603, . . . were ranked for each subject. It was found that the standard errors of the exemplary reading speeds were very small compared to the mean reading speeds for each cluster 601, 602, 603, . . . and each subject.

D. Improvement of the Exemplary Reading Speed

In order to check whether font clusters correspond to significantly different reading speeds, a Bayesian analysis of variance (ANOVA) is calculated according to embodiments. The assumption that there was no significant difference between the texts can be taken as the null hypothesis. So-called Bayes factors then provide decisive evidence against the null hypothesis, such that the clusters differ significantly in their mean reading speed. According to embodiments, a multivariate analysis of variance (MANOVA) determined statistically significant differences in reading speed between the clusters of subjects' highest reading speed, $F_{(10, 75)}=3.24$, $p<.001$; Pillai Trace=0.91. The corresponding ANOVA for each dimension was performed and revealed three significant differences D1: $F_{(10, 75)}=2.01$, $p<.05$; D2: $F_{(10, 75)}=3.63$, $p<.05$; D3: $F_{(10, 75)}=4.02$, $p<.05$ (F is the result of the F-test, or the ratio of the variances between and within the clusters, and p indicates the probability of credibility of the null hypothesis). These values are the exact data concerning the result of the ANOVA statistical test. In principle, the p-values are sufficient to prove significance. They are more detailed information about the significance of the improved reading speed due to the experiment with the test subjects.

Therefore, the differences between the clusters from FIG. 6A of the highest reading speed of the individuals are statistically significant. However, the distribution produced according to embodiments is not only statistically significantly different, but at the same time the reading speed is also statistically significantly faster on average. All subjects showed improved reading speed.

Finally, FIG. 7 shows a pangram for three examples (subjects) written in the respective typeface of the center of the cluster with the highest reading speed. The fonts are TrueType fonts and can be used as such.

The main aspects of embodiments can be summarized as follows:

Embodiments relate to a system (human-in-the-loop) for improving a parameter such as legibility of digitally rendered text. The system uses a learned generative typeface space 110 and Bayesian optimization to generate fonts that are evaluated with respect to exemplary individual user reading speed. Embodiments represent variation of font features in a specific typeface space learned by NMF. Using this representation, embodiments examine exemplar individual user reading speed using Bayesian optimization.

Results from user studies have demonstrated the feasibility of the approach, both in terms of the data needed to find fonts that increase individual reading speed and in terms of the statistically significant magnitude of improvement in individual reading speed. Finally, significant differences exist between subjects in the font regions that include fonts associated with high legibility or readability. The fonts generated may be actual TrueType font files that can be installed and used.

Although the fonts found in the experiment that maximized exemplary reading speed differed significantly between subjects, it cannot be concluded that the system finds a single font that invariably maximizes exemplary reading speed for a single subject or across all subjects. Rather, according to embodiments, the system may dynamically and continuously create the typefaces for an individual that maximizes the exemplary reading speed at the time of use. This may depend on the content of the text, whether one is exhausted, or perhaps using different display devices. The empirical data obtained by embodiments in the experiments clearly demonstrates that the system according to embodiments increases the exemplary reading speed of all participants.

While constant, variable, and parametric fonts have been designed and developed in the past, embodiments involve an interactive system that generates new fonts (i.e., unknown fonts) based on the user's interaction with the text. According to embodiments, the system dynamically and continuously creates fonts for a person, which maximized the exemplar reading speed at the time of use in the study. Evaluation of the system in a user study demonstrated the feasibility of the approach. The system can be used in conjunction with an eye tracker or with a webcam to automatically measure exemplary reading speed.

The features of the invention disclosed in the description, the claims and the figures may be essential to the realization of the invention either individually or in any combination.

LIST OF REFERENCE SIGNS

50 screen
55 baseline fonts
110 font space (typeface space)
105 starting point
106 changed position

The invention claimed is:

1. A computer-implemented method for producing optimized fonts for display on a screen, the method comprising:
   forming a font space in which various fonts as specific typefaces are characterized by dimensions of the font space or providing parametric font spaces, wherein the font space is formed as a continuous space with a dimension N that interpolates between M known fonts;
   selecting a starting point in the font space, wherein an associated starting font belongs to the starting point;
   continuously changing a position in the font space and thereby changing a font used for display in order to find an optimum for at least one parameter value; and
   providing the optimized fonts for display on the screen.

2. The method of claim 1, wherein one or more of the following is used for the at least one parameter value:
   a storage occupancy,
   an amount of printer ink when printing text,
   a scanning speed,
   a speed in automatic text recognition, a reading speed of a user, a memory of a user, a text comprehension of a user, a preference for the read text of a user.

3. The method of claim 1, further comprising detecting a quantity that determines the at least one parameter value.

4. The method of claim 1, wherein the dimension N of the font space is determined by cross-validation based on the M known fonts.

5. The method according to claim 1, wherein the font space is formed as follows:

setting up a data matrix, that includes entries for one known font in each row or column; forming a base matrix, and a coefficient matrix, by minimizing a Frobenius norm for a difference of the data matrix, and a product of the base matrix, and the coefficient matrix:

$$Min|X - W \times H|,$$

wherein the base matrix, has a dimension of M×N.

6. The method of claim 1, wherein the continuously changing the position to find the optimum comprises an application of at least one of the following:

a Bayesian optimization in which successive points in font space are tested to find regions in font space where the parameter value improves;

a density-based cluster analysis, wherein the parameter value to be optimized is added as a fourth dimension and the points of a data set are linearly arranged to spatially arrange nearest neighbors together as a cluster;

an analysis of variance to determine statistically significant differences between clusters.

7. A non-transitory computer-readable storage medium having instructions stored thereon which, when executed by a computer, cause the computer to perform the method of claim 1 following steps for producing optimized fonts for display on a screen:

forming a font space in which various fonts as specific typefaces are characterized by dimensions of the font space or providing parametric font spaces, wherein the font space is formed as a continuous space with a dimension N that interpolates between M known fonts;

selecting a starting point in the font space, wherein an associated starting font belongs to the starting point;

continuously changing a position in the font space and thereby changing a font used for display in order to find an optimum for at least one parameter value; and providing the optimized fonts for display on the screen.

8. A system for producing optimized fonts for display on a screen, the system comprising:

a font producer configured to form a font space in which various fonts are characterized by dimensions of the font space, wherein the font space is formed as a continuous space with a dimension N that interpolates between M known fonts;

a font optimizer adapted to select a starting point in the font space, wherein an associated starting font belongs to the starting point, and to change a font used for display by continuously changing the position in the font space in order to find an optimum for at least one parameter value; and an output interface for a screen configured to output the optimized font for display on the screen.

* * * * *